United States Patent
Seo et al.

(10) Patent No.: US 10,987,575 B2
(45) Date of Patent: Apr. 27, 2021

(54) SERVER AND METHOD FOR PROVIDING GAME SERVICE BASED ON INTERFACE EXPRESSING AUDIO VISUALLY

(71) Applicant: Netmarble Corporation, Seoul (KR)

(72) Inventors: Ilhwan Seo, Seoul (KR); Hyejeong Jeong, Seoul (KR)

(73) Assignee: Netmarble Corporation, Seoul (KR)

( * ) Notice: Subject to any disclaimer, the term of this patent is extended or adjusted under 35 U.S.C. 154(b) by 0 days.

(21) Appl. No.: 16/560,053

(22) Filed: Sep. 4, 2019

(65) Prior Publication Data
US 2020/0070044 A1 Mar. 5, 2020

(30) Foreign Application Priority Data
Sep. 5, 2018 (KR) .......................... 10-2018-0106079

(51) Int. Cl.
*A63F 13/00* (2014.01)
*A63F 13/2145* (2014.01)
*G06F 3/16* (2006.01)
*G06F 3/0484* (2013.01)

(52) U.S. Cl.
CPC ...... *A63F 13/2145* (2014.09); *G06F 3/04845* (2013.01); *G06F 3/165* (2013.01)

(58) Field of Classification Search
None
See application file for complete search history.

(56) References Cited

U.S. PATENT DOCUMENTS

| 8,858,312 B1* | 10/2014 | Ward | A63F 13/20 463/7 |
| 10,300,394 B1* | 5/2019 | Evans | G06F 3/16 |
| 2003/0207712 A1* | 11/2003 | Sterchi | A63F 13/822 463/23 |
| 2007/0218965 A1* | 9/2007 | Tilston | A63F 13/5378 463/2 |
| 2014/0143687 A1* | 5/2014 | Tan | G06F 3/04815 715/757 |
| 2017/0001112 A1* | 1/2017 | Gilmore | A63F 13/40 |

(Continued)

FOREIGN PATENT DOCUMENTS

| CN | 107992281 | 5/2018 |
| JP | 2000231644 | 8/2000 |

(Continued)

OTHER PUBLICATIONS

"Sonic Radar II—Introduction", http://www.asus.com/KR/support/FAQ/1009778, Sep. 13, 2018.

(Continued)

*Primary Examiner* — Paul A D'Agostino
(74) *Attorney, Agent, or Firm* — Boyle Fredrickson S.C.

(57) ABSTRACT

Disclosed is a game service providing server and method. The game service providing server includes a processor configured to generate a game interface in which an audio generated in the vicinity of a game character of a user is visualized through an interface element, and provide a game service based on the generated game interface. The processor may generate the game interface including a plurality of interface elements arranged in preset regions, adjust the interface element based on audio data related to the audio, and generate the visualized game interface based on a result of the adjusting.

19 Claims, 15 Drawing Sheets

(56) References Cited

U.S. PATENT DOCUMENTS

| | | | | |
|---|---|---|---|---|
| 2017/0006322 | A1* | 1/2017 | Dury | A63F 13/49 |
| 2017/0050111 | A1* | 2/2017 | Perry | H04L 67/10 |
| 2019/0060758 | A1* | 2/2019 | Ge | A63F 13/533 |
| 2019/0149886 | A1* | 5/2019 | Eronen | G02B 27/0093 |
| | | | | 725/86 |
| 2020/0147487 | A1* | 5/2020 | Mahlmeister | A63F 13/843 |
| 2020/0183565 | A1* | 6/2020 | Cronholm | G06F 3/04812 |

FOREIGN PATENT DOCUMENTS

| | | |
|---|---|---|
| JP | 2009240360 | 10/2009 |
| JP | 2015055718 | 3/2015 |
| JP | 2016047193 | 4/2016 |
| JP | 2017055935 | 3/2017 |
| JP | 6332652 | 5/2018 |
| JP | 2018097649 | 6/2018 |
| KR | 20070007898 | 1/2007 |

OTHER PUBLICATIONS

"Do you know Sonic Radar that visually tracks [Chat] [Bagg] sounds?", http://bbs.ruliweb.com/community/board/300143/read/34209024, Oct. 12, 2018.

"Nahimic2+(Nahimic 2+) bagg applied video", https://www.youtube.com/watch?v=HcwLHyOKcGM, Dec. 29, 2017.

* cited by examiner

SERVER AND METHOD FOR PROVIDING GAME SERVICE BASED ON INTERFACE EXPRESSING AUDIO VISUALLY

CROSS-REFERENCE TO RELATED APPLICATION(S)

This application claims the benefit of Korean Patent Application No. 10-2018-0106079, filed on Sep. 5, 2018, in the Korean Intellectual Property Office, the disclosure of which is incorporated herein by reference.

BACKGROUND

1. Field of the Invention

One or more example embodiments relate to game service providing technology.

2. Description of the Related Art

A game service provides a game interface and an audio associated with game play together. By adjusting an audio to be provided based on a direction in which the audio is generated relative to a character of a user, a more realistic game service may be provided. Further, provision of various audios is an essential element to provide a game service as information required for smooth play of a first person shooter, for example. As a means of assisting an audio, a vibration may be provided together with the audio when a predetermined event occurs in the game service.

SUMMARY

According to an aspect, there is provided a game service providing server including a processor configured to generate a game interface in which an audio generated in the vicinity of a game character of a user is visualized through an interface element, and provide a game service based on the generated game interface, wherein the processor may be configured to generate the game interface including a plurality of interface elements arranged in preset regions, adjust the interface element based on audio data related to the audio, and generate the visualized game interface based on a result of the adjusting.

The processor may be configured to obtain first direction data related to a direction in which the audio is received based on the audio data related to the audio, determine a position at which the interface element is to be disposed in one region based on the first direction data, generate the game interface based on a result of the determining, and provide the game service based on the generated game interface.

The one region may include a mini map configured to provide position data of the game character included in the game interface, wherein the processor may be configured to determine a region on the mini map in which the interface element is to be disposed based on the first direction data, and generate the game interface based on a result of the determining.

The one region may include a region adjacent to a control interface configured to control a movement of the game character included in the game interface, wherein the processor may be configured to obtain third direction data related to a plurality of regions included in the adjacent region, the third direction data determined based on a positional relationship between the plurality of regions and a center of the control interface, and determine one region in which the interface element is to be disposed among the plurality of regions based on the first direction data and the third direction data.

The processor may be configured to obtain first direction data related to a direction in which the audio is received based on the audio data, obtain second direction data related to the plurality of interface elements based on a positional relationship between the interface elements and a central region of the game interface, determine at least one interface element corresponding to the direction in which the audio is received based on the first direction data and the second direction data, and adjust a size of the at least one interface element.

The processor may be configured to determine a size adjustment ratio of the at least one interface element based on a volume of the audio determined based on the audio data.

The processor may be configured to adjust at least one of a type, a size, and a color of the interface element based on a volume of the audio.

When the audio corresponds to an audio generated intermittently, the processor may be configured to control the interface element to blink based on a generation interval of the audio.

The processor may be configured to display an interface element corresponding to a type of the audio in the direction in which the audio is received, and determine a blinking rate of the displayed interface element based on a speed at which a game character generating the audio approaches the game character of the user.

According to another aspect, there is provided a game service providing server including a processor configured to generate a game interface in which an audio generated in the vicinity of a game character of a user is visualized, and provide a game service based on the generated game interface, wherein the processor may be configured to obtain position data related to a position at which the audio is generated based on audio data related to the audio, determine a region on the game interface corresponding to the position data, enlarge the determined region, generate the visualized game interface based on a result of the enlarging, and control the game service based on the generated visualized game interface.

The processor may be configured to determine an enlargement ratio of the determined region based on a volume of the audio.

The processor may be configured to control the determined region to be enlarged and reduced repetitively based on a generation interval of the audio, when the audio is generated intermittently.

According to another aspect, there is provided a game service providing method including generating a game interface including a plurality of interface elements, adjusting an interface element based on audio data related to an audio generated in the vicinity of a game character of a user, generating the game interface in which the audio is visualized based on a result of the adjusting, and providing a game service based on the visualized game interface.

The adjusting may include obtaining first direction data related to a direction in which the audio is received based on the audio data, and determining a position at which the interface element is to be disposed in one region based on the first direction data.

The one region may include a mini map configured to provide position data of the game character, wherein the determining may be determining a region on the mini map in which the interface element is to be disposed based on position data of the game character provided through the mini map and position data of a source providing the audio.

The adjusting may include obtaining first direction data related to a direction in which the audio is received based on the audio data, obtaining second direction data related to the plurality of interface elements based on a positional relationship between the interface elements and a central region of the game interface, determining at least one interface element corresponding to the direction in which the audio is received based on the first direction data and the second direction data, and adjusting a size of the at least one interface element.

The adjusting may include adjusting at least one of a type, a size, and a color of the interface element based on a volume of the audio.

The game service providing method may further include displaying an interface element corresponding to a type of the audio in a direction in which the audio is received, wherein the adjusting may include determining a blinking rate of the displayed interface element based on a speed at which a game character generating the audio approaches the game character of the user.

The adjusting may include adjusting the interface element based on a relationship between an entity generating the audio and the game character.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
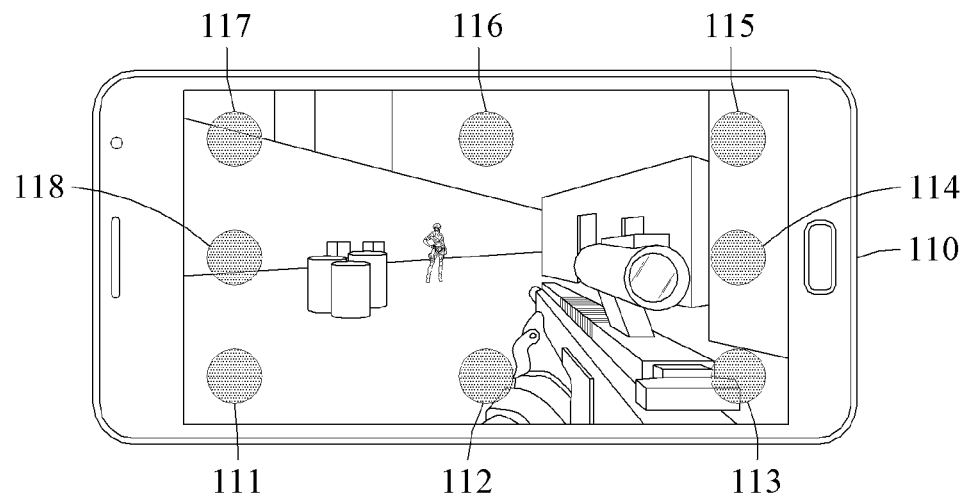
FIGS. 1A and 1B illustrate an operation of a game service providing system according to an example embodiment.

The following detailed structural or functional description is provided as an example only and various alterations and modifications may be made to the examples. Accordingly, the examples are not construed as being limited to the disclosure and should be understood to include all changes, equivalents, and replacements within the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 1B:
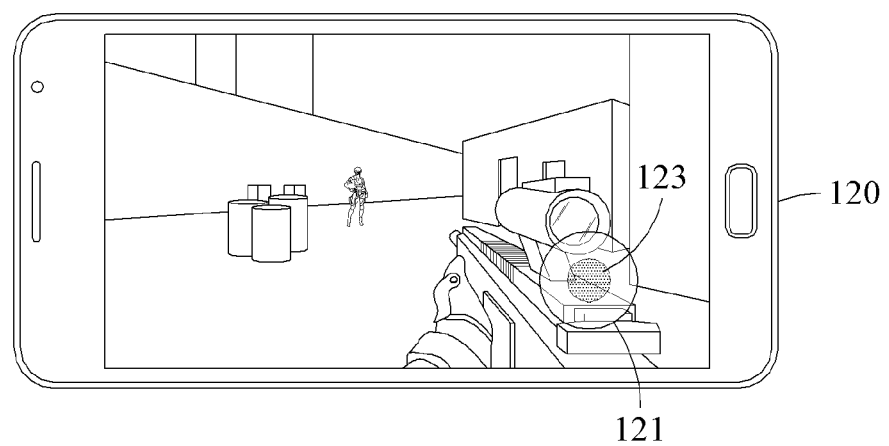

FIGS. 1A and 1B illustrate an operation of a game service providing system according to an example embodiment.

An audio (for example, a sound) provided in a game service may include an audio of background music, an audio of game motion effect, an audio of environment in the vicinity of a character of a user, or an audio of another character.

Although the audio provided in the game service also provides an additional effect representing an atmosphere, the audio may be one of essential elements for game play. For example, an audio in a first-person shooter may provide information related to a position of a game character of another user, which is essential information for game play.

However, it is impossible for the hearing-impaired to identify an audio, they may have difficulties in enjoying the game where audio information plays a significant role. In addition, in a circumstance where it is difficult to increase a volume of an audio (for example, in a library) or in a circumstance where it is difficult to identify an audio (for example, in a noisy circumstance), a user may have difficulties in enjoying the game where audio information plays a significant role.

A game service providing system may provide a game interface in which an audio provided in a game service is visualized. The game service providing system may visually provide information related to a direction in which the audio is received, information related to the volume of the audio, and information related to a type of the audio through the game interface. Through this, the game service providing system may provide a more effective interface in games where audio information plays a significant role for game play, and provide a means enabling a user to enjoy a game irrespective of a surrounding circumstance or a hearing ability.

In addition, a game service providing server may provide an audio through a visualization device such as an assistant user interface (UI) of a game screen, a vibration, or a lamp.

The term "interface element" used herein may refer to a predetermined shaped-interface configured to provide information related to an audio on a game interface. The shape of the interface element may include a shape of a predetermined figure, for example, a circle, an oval or a quadrilateral, and a shape of a predetermined object, for example, a footprint, or a bullet, but is not limited thereto.

The game service providing system may provide audios provided in the game service in visual forms based on interface elements 111, 112, 113, 114, 115, 116, 117, and 118 arranged along edges of the game screen, as shown in a user terminal 110. The game service providing system may determine at least one of the interface elements 111, 112, 113, 114, 115, 116, 117, and 118 based on a direction in which an audio is received, and adjust the determined at least one of the interface elements 111, 112, 113, 114, 115, 116, 117, and 118. For example, when an audio is received from a right-rear side of a game character of a user, the game service providing system may adjust the interface element 113 corresponding to the right-rear side, thereby visually providing information related to the audio.

The game service providing system may provide an audio provided in the game service in a visual form through an interface 123 disposed in one region 121 of the game screen, as shown in a user terminal 120. For example, when the audio is received from a right-rear side of a game character of a user, the game service providing system may dispose the interface element 123 in a region corresponding to the right-rear side (for example, in a direction of 5 o'clock) in the one region 121, or move the interface element 123 placed at a center of the region 121 to a region corresponding to the right-rear side (for example, in a direction of 5 o'clock). Through this, the game service providing system may visually provide the direction in which the audio is received, and provide additional information related to the audio through an additional adjustment (for example, a size or a color) with respect to the interface element 123.

The operation of the game service providing system will be described further below with reference to the accompanying drawings.

Figure 2:
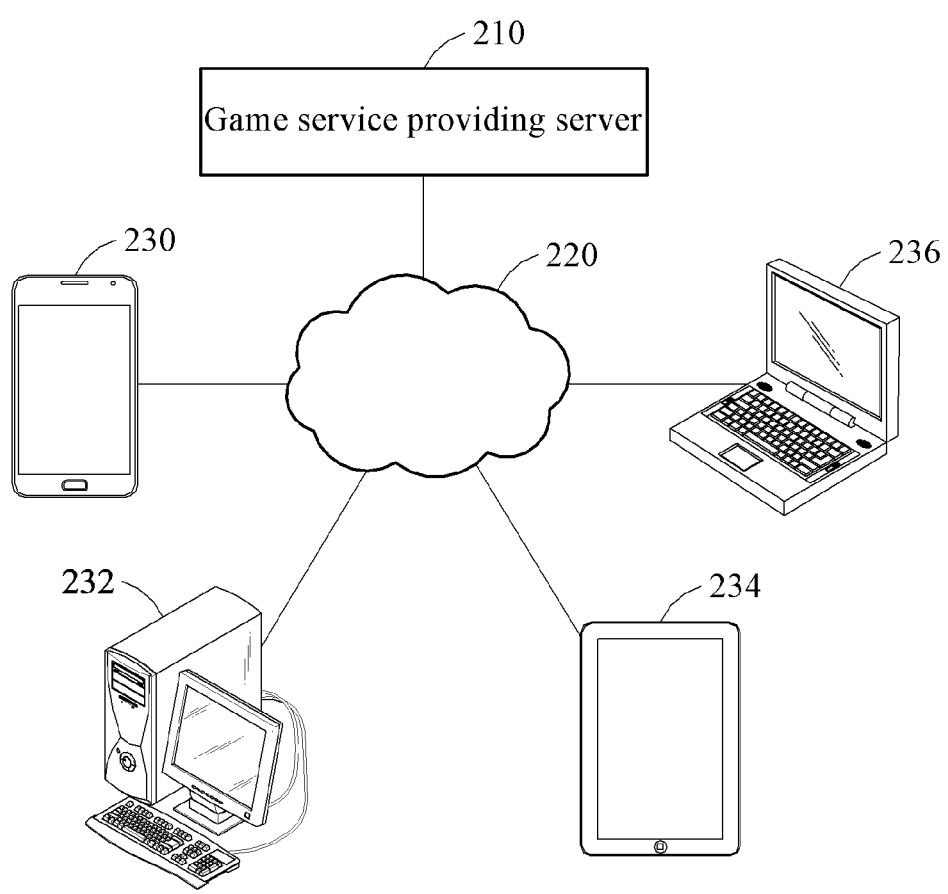
FIG. 2 illustrates a network configuration of a game service providing system according to an example embodiment.

FIG. 2 illustrates a network configuration of a game service providing system according to an example embodiment.

As shown in FIG. 2, a game service providing system may be configured by connecting a game service providing server 210 and a plurality of user terminals 230, 232, 234, and 236 through a communication network 220 such as the Internet. The game service providing server 210 may also be referred to as a Web Server, and provide a game service to the user terminal 230, 232, 234, 236 through the communication network such as the Internet. The game service providing server 210 may provide a game interface in which an audio provided in the game service is visualized to the user terminal 230, 232, 234, 236.

The user terminal 230, 232, 234, 236 may be a terminal with a communication function to access a server through the communication network, and may be one of various electronic devices widely distributed to ordinary users today, such as, for example, a smart phone, a personal computer (PC), a tablet, and a notebook, and also include a predetermined communication device not limited thereto. A client program may be installed on the user terminal 230, 232, 234, 236, and the user terminal 230, 232, 234, 236 may access the game service providing server 210 through the program.

Figure 3:
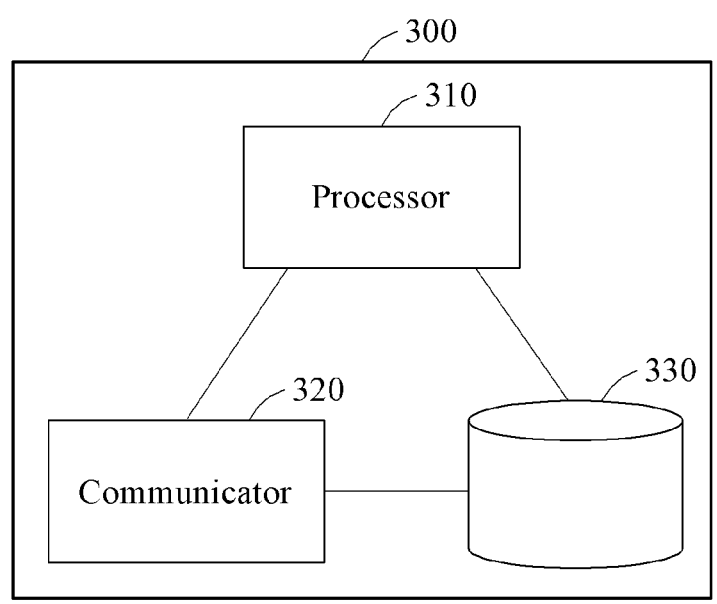
FIG. 3 illustrates an overall configuration of a game service providing server according to an example embodiment.

FIG. 3 illustrates an overall configuration of a game service providing server according to an example embodiment.

Referring to FIG. 3, a game service providing server 300 may include a processor 310 configured to perform an operation associated with game service provision, a database 330 configured to store data associated with an interface provided in a game service, and a communicator 320 configured to communicate with a user terminal.

The processor 310 may generate a game interface in which an audio generated in the vicinity of a game character of a user is visualized through an interface element, and provide the game service based on the generated game interface.

The processor 310 may generate a game interface including a plurality of interface elements arranged along edges of the game interface, adjust an interface element based on audio data related to the audio generated in the vicinity of the game character, and generate the game interface in which the audio provided in the game service is visualized based on a result of the adjusting.

To determine an interface element to be adjusted to visualize a surrounding audio, among the plurality of interface elements, the processor 310 may obtain first direction data related to a direction in which the audio is received based on the audio data. The first direction data may include information related to the direction in which the audio is received based on a current viewpoint of the game character of the user provided through the game interface.

The processor 310 may obtain second direction data related to the plurality of interface elements based on a positional relationship between the interface elements and a central region of the game interface. For example, second direction data of an interface element positioned at 5 o'clock in the game interface may indicate a direction corresponding to a right-rear side, and second direction data of an interface element positioned at 12 o'clock may indicate a direction corresponding to a front side.

The processor 310 may determine at least one interface element corresponding to the direction in which the audio is received based on the first direction data and the second direction data, and adjust a size of the determined at least one interface element. For example, when an audio is received from a left-rear side at a viewpoint of the game character of the user, the processor 310 may obtain first direction data related to the audio indicating the direction corresponding to the left-rear side, and determine at least one interface element corresponding to the second direction data indicating the left-rear side. The processor 310 may adjust a size of the determined at least one interface element based on a volume of the audio.

The processor 310 may determine a size adjustment ratio of the at least one interface element based on the volume of the audio determined based on the audio data. For example, the processor 310 may adjust the size of the interface element to increase as the volume of the audio increases.

The processor 310 may determine the size adjustment ratio of the interface element based on a similarity between the first direction data and the second direction data. For example, when the first direction data indicating the direction in which the audio is received indicates a direction between a rear side and a left-rear side and closer to the rear side than the left-rear side, the processor 310 may adjust a size of an interface element corresponding to the second direction data of the direction corresponding to the rear side to be greater than an interface element corresponding to the second direction data of the direction corresponding to the left-rear side. This example will be described further in detail with reference to FIGS. 5A and 5B.

The processor 310 may determine a type of the interface element based on a type of the audio. For example, when the audio corresponds to a sound of footsteps, the processor 310 may dispose an interface element corresponding to a footprint in the game interface. When the audio corresponds to a sound of gunshots, the processor 310 may dispose an interface element corresponding to a bullet in the game interface. However, the type of the audio and the type of the interface element are not limited thereto.

The processor 310 may determine a color of the interface element based on the type of the audio. For example, when an entity generating the audio is in the same team of the game character of the user, the processor 310 may determine the interface element to be in blue. When the entity generating the audio is in an opposing team, the processor 310 may determine the interface element to be in red. However, the scheme of determining the color of the interface element is not limited thereto.

When the audio corresponds to an audio generated intermittently, the processor 310 may control the interface element to blink based on a generation interval of the audio. For example, when the audio corresponds to a sound of intermittent gunshots, the processor 310 may dispose the interface element blinking based on an interval of the gunshots in the game interface.

The interface element disposed in the game interface may be semitransparent. Since the interface element is semitransparent, the game interface overlaid with the interface element may not be entirely occluded by the interface element, but be shown through the interface element. Further, the interface element does not include a corresponding event. Thus, even when the user touches the interface element, an additional event may not occur.

The game interface may further include a region in which an interface element indicating information related to an audio of the game character of the user is disposed. For example, the game interface may include a region in which an interface element for visualizing the audio generated by the game character of the user as well as the audio generated in the vicinity of the game character of the user is disposed. The interface element corresponding to the audio of the game character of the user may be provided in a shape of a figure such as a circle or a quadrilateral, or a gauge.

However, the shape of the interface element is not limited thereto. An example thereof will be described with reference to FIG. 6.

According to another example embodiment, the processor 310 of the game service providing server 300 may generate a game interface in which an interface element corresponding to an audio generated in the vicinity of the game character of the user is disposed in one region of the game interface, and provide the game service based on the generated game interface. An example of providing the game service based on the interface element disposed in the one region will be described with reference to FIGS. 7A through 9.

The processor 310 may obtain first direction data related to a direction in which the audio is received based on audio data including information related to the audio, determine a position at which the interface element is to be disposed in the one region based on the obtained first direction data, and provide the game service based on the game interface generated based on a result of the determining.

The one region in which the interface element is disposed may include a mini map providing position data of the game character included in the game interface. The processor 310 may determine a region on the mini map in which the interface element is to be disposed based on the first direction data, and generate the game interface based on a result of the determining. A scheme of visualizing the audio based on the interface element disposed in the mini map will be described in detail with reference to FIG. 8.

The one region in which the interface element is to be disposed may include a region adjacent to a control interface configured to control a movement of the game character included in the game interface. The processor 310 may obtain third direction data related to a plurality of regions included in the region adjacent to the control interface, the third direction data determined based on a positional relationship between the plurality of regions and a center of the control interface, and determine one region in which the interface element is to be disposed among the plurality of regions based on the first direction data and the third direction data.

Further, the processor 310 may determine a maximum value of distances between the center of the control interface and points included in the interface element based on a volume of the audio. For example, the shape of the interface element may include a figure of a waveform shape. A maximum value of distances between points included in the figure of the waveform shape and the center of the control interface (for example, a distance between a vertex and the center of the control interface) may be set to be proportional to the volume of the audio.

A scheme of visualizing the audio based on the interface element disposed in the region adjacent to the control interface will be described with reference to FIG. 9.

The one region in which the interface element is disposed may include a preset region of the game character or a central region of a gunpoint item.

The processor 310 may obtain fourth direction data related to a plurality of regions included in the one region, the fourth direction data determined based on a positional relationship between the plurality of regions and a center of the one region, and determine one region in which the interface element is to be disposed among the plurality of regions based on the first direction data and the fourth direction data.

A scheme of visualizing the audio based on the central region of the gunpoint item will be described in detail with reference to FIGS. 11A and 11B.

The processor 310 may adjust at least one of a type, a size, and a color of the interface element based on the volume of the audio. For example, the processor 310 may dispose, in the game interface, the interface element including an adjustable number of rectangular figures to be stacked as the volume of the audio increases. The processor 310 may set the interface element to be enlarged or to be in a darker color as the volume of the audio increases.

According to still another example embodiment, the processor 310 of the game service providing server 300 may obtain position data related to a position at which the audio is generated based on audio data related to the audio generated in the vicinity of the game character of the user. The processor 310 may determine a region on the game interface corresponding to the obtained position data, and enlarge the determined region. The processor 310 may generate the visualized game interface based on a result of the enlarging, and provide the game service based on the generated visualized game interface.

The processor 310 may determine an enlargement ratio to enlarge the region based on the volume of the audio. For example, the processor 310 may set the enlargement ratio of the region to be great as the volume of the audio is high.

The processor 310 may control the region determined based on the position data to be enlarged and reduced repetitively based on a generation interval of the audio, when the audio is generated intermittently.

Figure 4A:
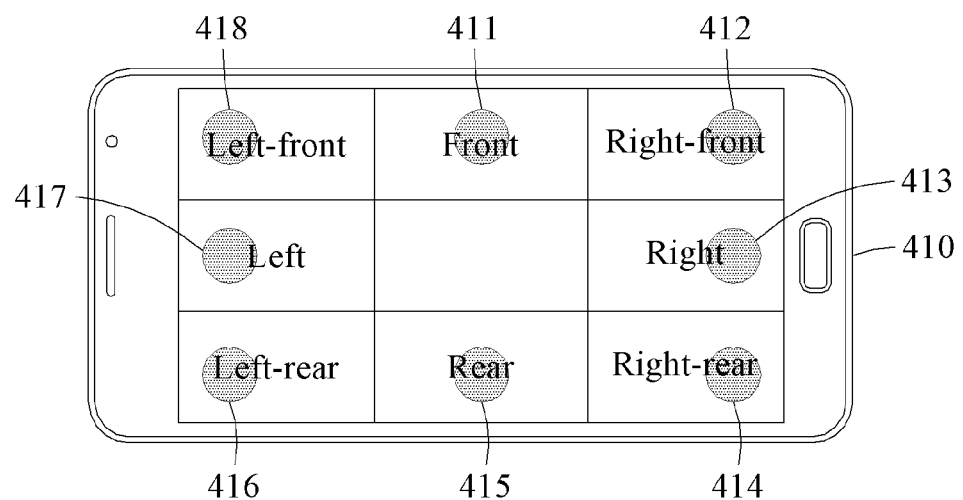
FIGS. 4A and 4B illustrate a game interface in which an audio is visualized according to an example embodiment.
Figure 4B:
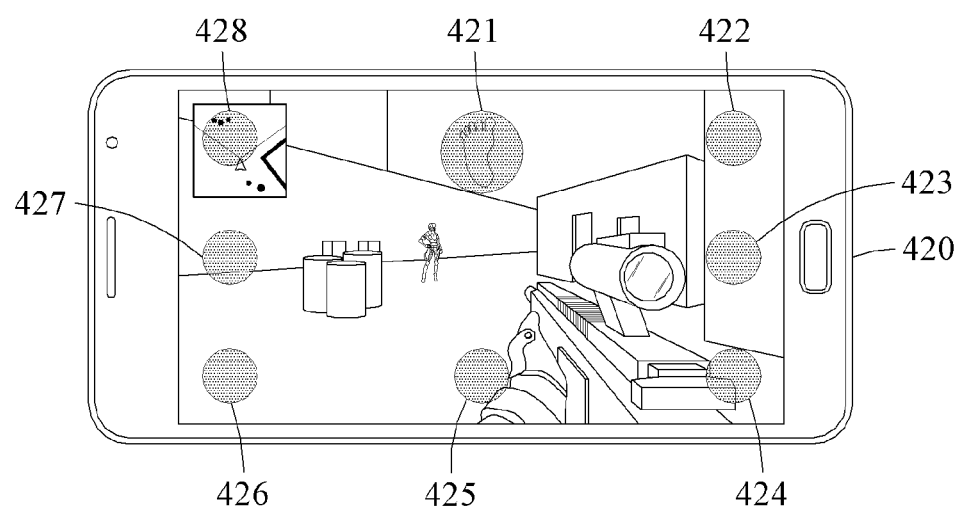

FIGS. 4A and 4B illustrate a game interface in which an audio is visualized according to an example embodiment.

Referring to FIGS. 4A and 4B, a game service providing server may divide a game screen into a predetermined number of regions, and dispose interface elements 411, 412, 413, 414, 415, 416, 417, and 418 in the regions of the game screen as shown in a user terminal 410. As shown in the user terminal 410, the game service providing server may arrange the interface elements 411, 412, 413, 414, 415, 416, 417, and 418 along edges of a game interface. The interface elements 411, 412, 413, 414, 415, 416, 417, and 418 may respectively correspond to different items of second direction data. The second direction data may be determined based on a positional relationship between a center of the game screen and the interface elements 411, 412, 413, 414, 415, 416, 417, and 418. For example, second direction data of the interface element 414 may indicate a direction corresponding to a right-rear side, and second direction data of the interface element 411 may indicate a direction corresponding to a front side.

A user terminal 420 illustrates an example in which interface elements 421, 422, 423, 424, 425, 426, 427, and 428 are applied to a real game interface. The interface elements 421, 422, 423, 424, 425, 426, 427, and 428 may be semitransparent. Thus, the overlaid game interface may be displayed to be shown through the interface elements 421, 422, 423, 424, 425, 426, 427, and 428. Further, the interface elements 421, 422, 423, 424, 425, 426, 427, and 428 do not include corresponding events. Thus, even when a user touches the interface elements 421, 422, 423, 424, 425, 426, 427, and 428, additional events may not occur.

A shape of the interface element 421, 422, 423, 424, 425, 426, 427, 428 may be determined based on a type of the audio, and a size thereof may be changed based on a volume of the audio. In detail, the size, for example, a diameter, of the interface element 421, 422, 423, 424, 425, 426, 427, 428 may increase up to twice. For example, when an audio corresponding to a sound of footsteps is received from a direction corresponding to the front side, the interface element 421 corresponding to second direction data indicating the front side may be enlarged, and the interface element 421 corresponding to a footprint may be displayed. Further, the interface element 421 may blink. In detail, when a game character making a sound of footsteps on the front side approaches a game character of the user, the interface element 421 may blink. In this example, when the game character making the sound of footsteps on the front side approaches the game character of the user fast, the interface element 421 may blink fast. When the game character making the sound of footsteps on the front side approaches the game character of the user slowly, the interface element 421 may blink slowly.

Figure 5A:
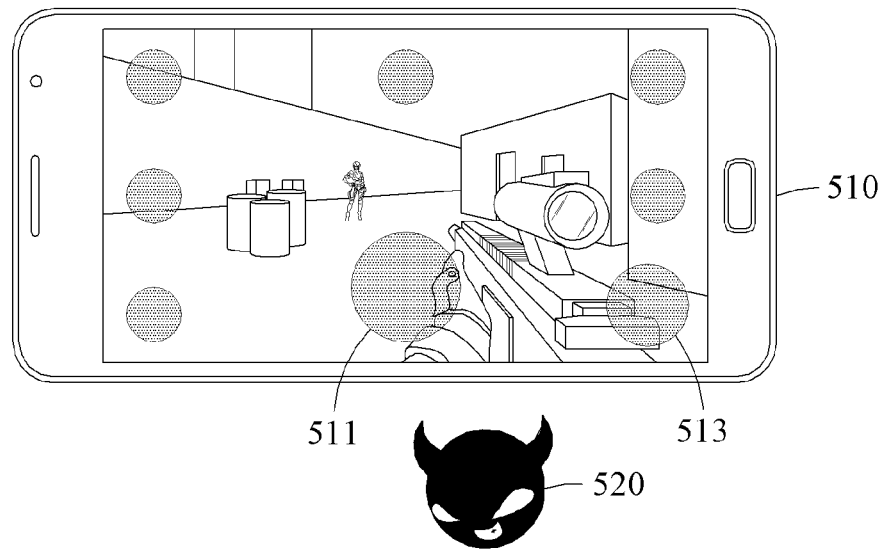
FIGS. 5A and 5B illustrate an example of changing an interface element based on a direction in which an audio is received according to an example embodiment.
Figure 5B:
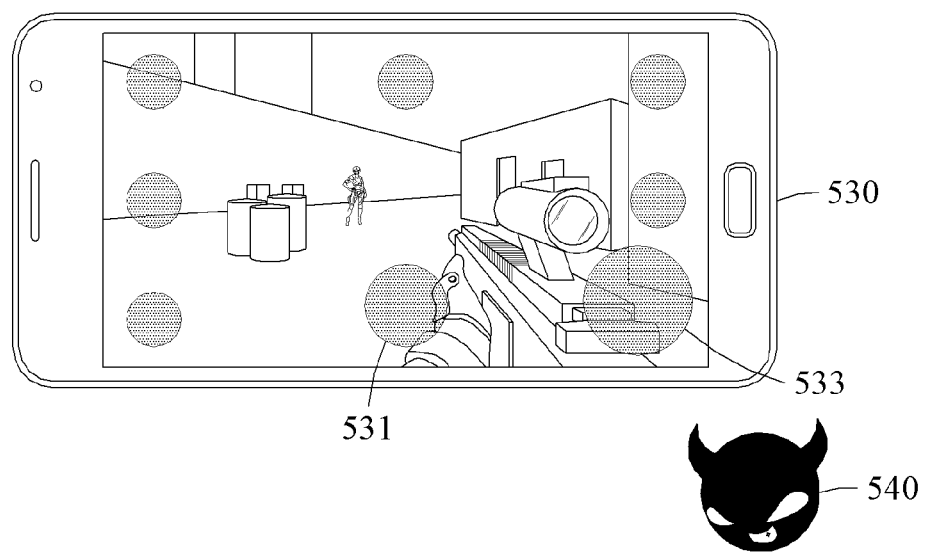

FIGS. 5A and 5B illustrate an example of changing an interface element based on a direction in which an audio is received according to an example embodiment.

A game service providing server may determine a size adjustment ratio of an interface element based on a similarity between first direction data and second direction data. That is, the game service providing server may adjust a size of an interface element with a relatively high similarity to increase based on a similarity between a direction in which an audio is received (a direction corresponding to the first direction data) and a direction corresponding to an interface element (a direction corresponding to the second direction data).

Referring to FIGS. 5A and 5B, a user terminal 510 corresponds to a situation in which an audio generated from an audio source 520 is received from a direction corresponding to a middle of a direction corresponding to an interface element 511 (a direction corresponding to a rear side) and a direction corresponding to an interface element 513 (a direction corresponding to a right-rear side). The audio generated from the audio source 520 may be received from a direction with a higher similarity to the direction corresponding to the interface element 511 than the direction corresponding to the interface element 513. The game service providing server may adjust a size of the interface element 511 to be greater than a size of the interface element 513.

A user terminal 530 corresponds to a situation in which an audio generated from an audio source 540 is received in a direction closer to a direction corresponding to an interface element 533 (a direction corresponding to a right-rear side) than a direction corresponding to an interface element 531 (a direction corresponding to a rear side). The game service providing server may adjust a size of the interface element 533 to be greater than a size of the interface element 531.

Figure 6:
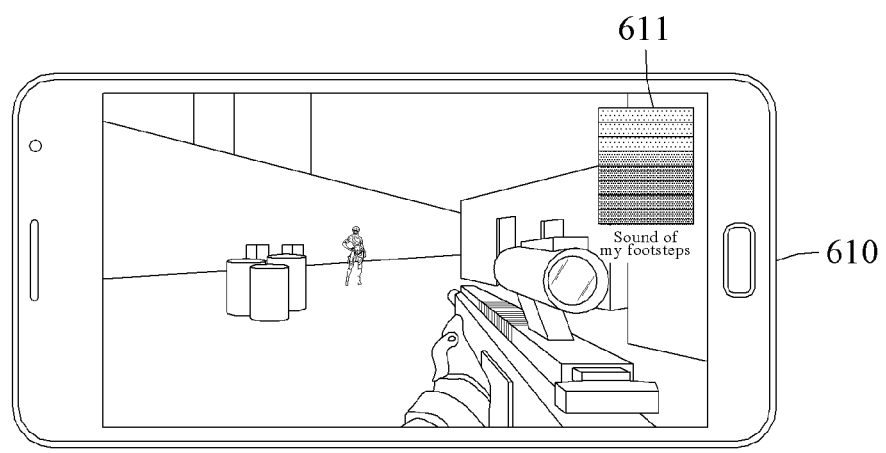
FIG. 6 illustrates an example of a game interface in which an audio generated by a game character of a user is visualized according to an example embodiment.

FIG. 6 illustrates an example of a game interface in which an audio generated by a game character of a user is visualized according to an example embodiment.

A game interface may include a region in which an interface element indicating information related to an audio of a game character of a user is disposed.

Referring to FIG. 6, a user terminal 610 illustrates a situation in which a game interface includes, on an upper-right side, a region in which an interface element 611 visualizing a sound of footsteps of the game character of the user is disposed. The interface element 611 may be in a shape of a gauge as shown in FIG. 6. However, the shape of the interface element 611 is not limited thereto, and may be provided in any predetermined shape. Further, although the interface element currently shown is opaque, the interface element may be semitransparent.

Figure 7A:
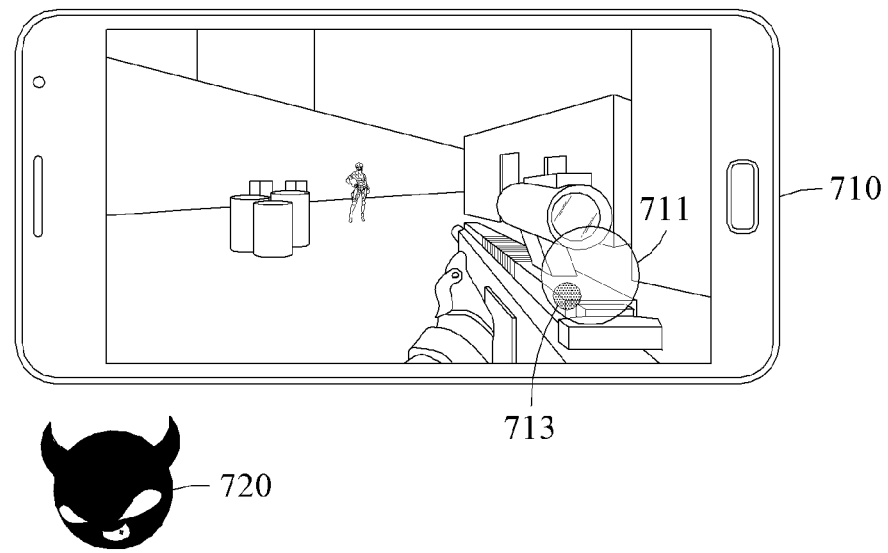
FIGS. 7A and 7B illustrate an example of changing an interface element based on a direction in which an audio is received according to an example embodiment.
Figure 7B:
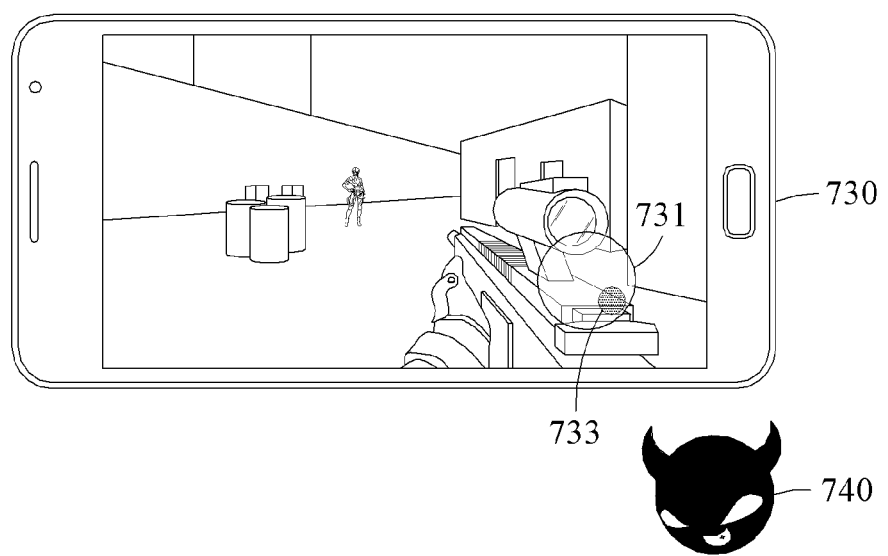

FIGS. 7A and 7B illustrate an example of changing an interface element based on a direction in which an audio is received according to an example embodiment.

A game service providing server may generate a game interface in which an interface element corresponding to an audio generated in the vicinity of a game character of a user is disposed in one region. The game service providing server may determine a position in which the interface element is to be disposed in the one region based on first direction data related to a direction in which the audio is received, and generate the game interface in which the surrounding audio of the game character is visualized based on a result of the determining.

Referring to FIGS. 7A and 7B, a game interface displayed on a user terminal 710 may include a region 711 in which an interface element 713 is to be disposed. The game service providing server may dispose the interface element 713 at a position in the region 711, the position corresponding to a direction in which an audio generated from an audio source 720 is received (a left-rear side).

Similarly, a game interface displayed on a user terminal 730 may also include a region 731 in which an interface element 733 is to be disposed. The game service providing server may dispose the interface element 733 at a position in the region 731, the position corresponding to a direction in which an audio generated from an audio source 740 is received (a right-rear side).

Figure 8:
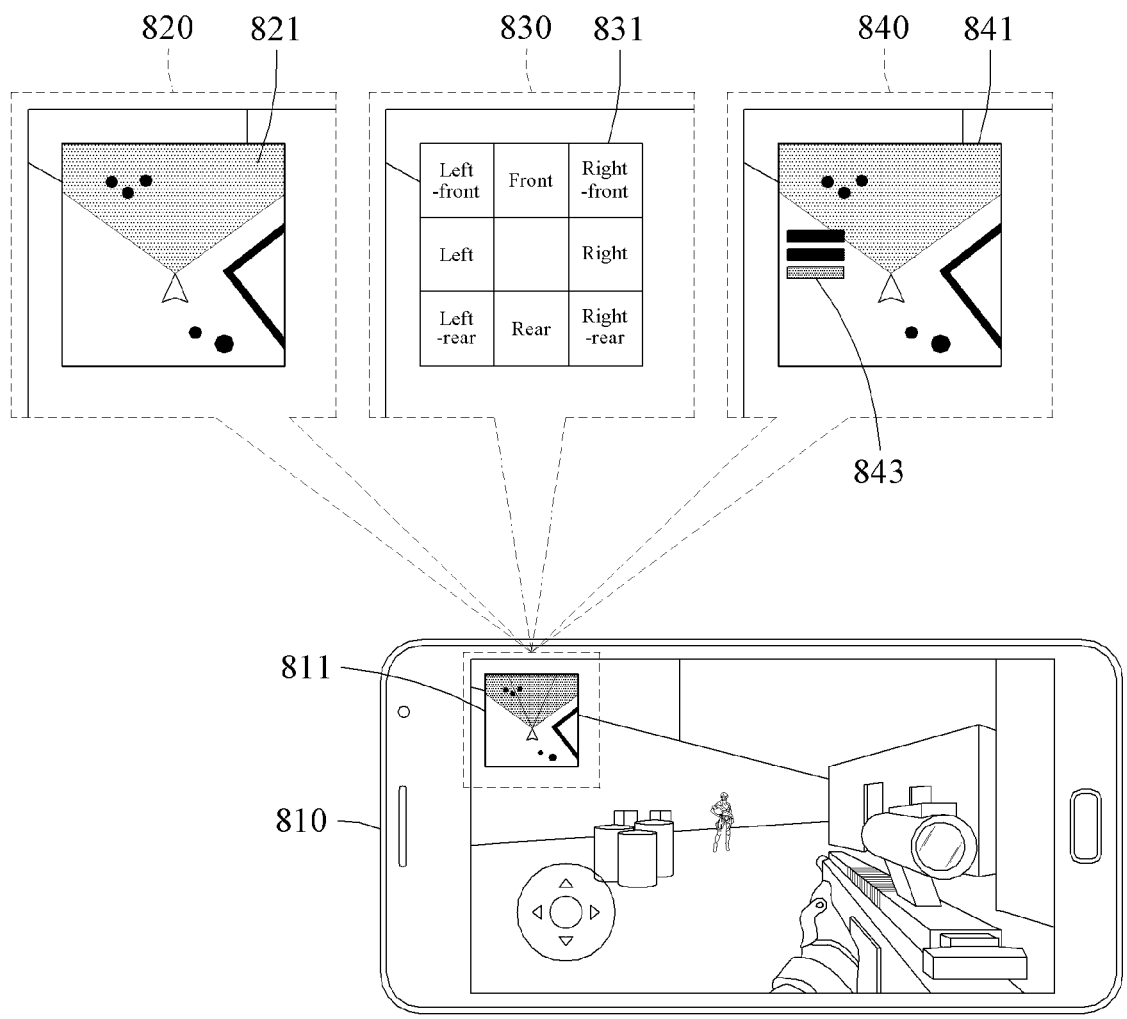
FIG. 8 illustrates an example of visualizing an audio through an interface element disposed on a mini map according to an example embodiment.

FIG. 8 illustrates an example of visualizing an audio through an interface element disposed on a mini map according to an example embodiment.

A game service providing server may dispose an interface element on a mini map providing position data of a game character. The game service providing server may determine a region on the mini map in which the interface element is to be disposed based on first direction data related to a direction in which an audio is received, and generate an interface in which a surrounding audio is visualized based on a result of the determining.

Referring to FIG. 8, a game interface displayed on a user terminal 810 may include a mini map 811 providing information related to a current position of a game character.

A mini map 821 displayed on a screen 820 shows a situation in which an audio is not generated in the vicinity.

A mini map 831 displayed on a screen 830 shows directions corresponding to respective regions included in the mini map 831.

A screen 840 shows a situation in which an interface element 843 is displayed on a mini map 841 when a loud sound is generated from a left direction.

As shown in the mini map 831, the directions corresponding to the respective regions may be predetermined, and an interface element may be disposed in a determined region.

In another example, the interface element 843 may be disposed at a position of an audio source based on position information of the game character and position information of the audio source displayed on the mini map 841. Further, when the source generating a sound on the left side approaches the game character of the user, the interface element 843 may blink. The source may be a game character of an opposing team, or a game character of the same team. When the source approaches the game character of the user fast, the interface element 843 may blink fast. When the source approaches the game character of the user slowly, the interface element 843 may blink slowly.

Figure 9:
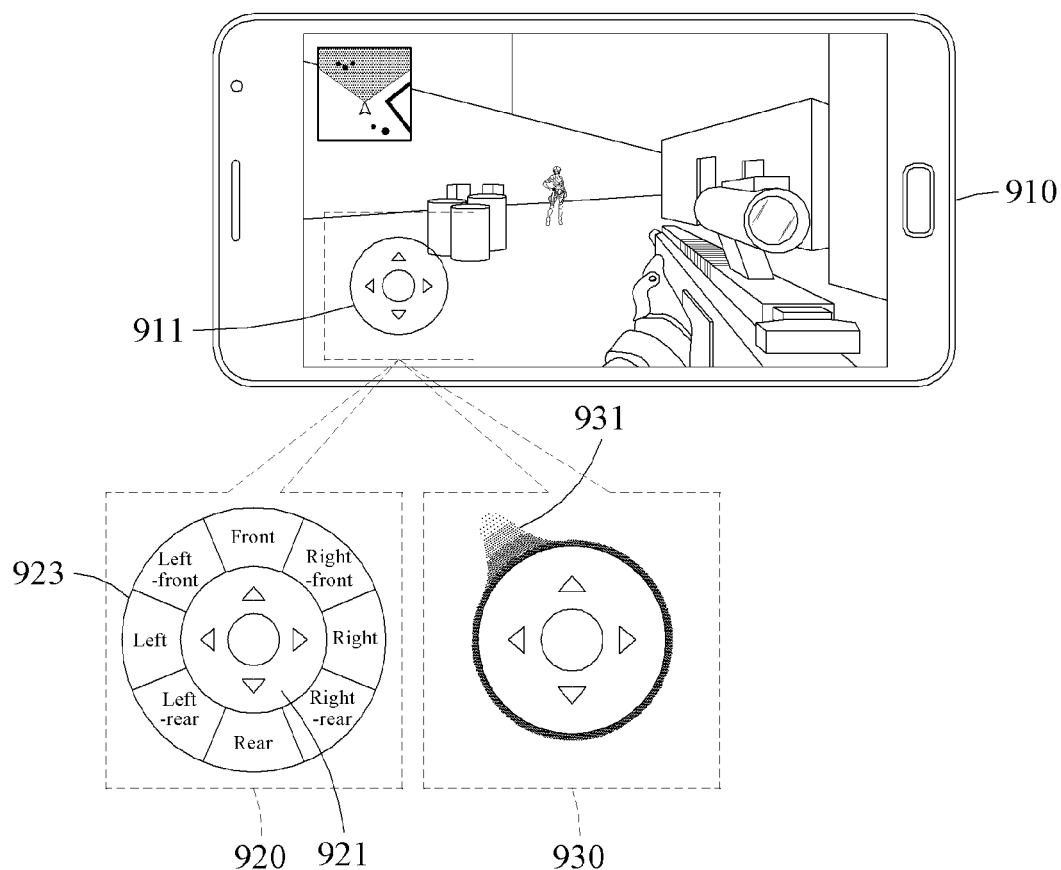
FIG. 9 illustrates an example of visualizing an audio based on an interface element disposed in a region adjacent to a control interface according to an example embodiment.

FIG. 9 illustrates an example of visualizing an audio based on an interface element disposed in a region adjacent to a control interface according to an example embodiment.

A game interface may include a control interface configured to control a movement of a game character. A game service providing server may determine third direction data related to a plurality of regions included in a region adjacent to the control interface based on a positional relationship between the plurality of regions and a center of the control interface, and determine a region in which an interface element is to be disposed based on first direction data related to a direction in which an audio is received and the third direction data.

Referring to FIG. 9, a game interface displayed on a user terminal 910 may include a control interface 911 configured to control a movement of a game character.

As shown in a screen 920, respective directions corresponding to regions 923 adjacent to a control interface 921 may be predetermined. The corresponding directions may be determined based on third direction data obtained based on a positional relationship between a center of the control interface 921 and the respective regions.

A screen 930 shows a situation in which an interface element 931 is disposed in a region adjacent to a control interface when an audio is received from a left-front side. As shown in the screen 930, the interface element 931 may have a spiral shape and a color tone adjustable based on a volume of the audio. For example, a color of the interface element may be determined in three tones based on a predetermined volume condition. As shown in the screen 930, in a case of an audio with maximum volume, all the three color tones may be included in the interface element. Further, when a source generating an audio on the left-front side approaches the game character of the user, the interface element 931 may blink. The source may be, for example, a game character of an opposing team or a game character of the same team. When the source approaches the game character of the user fast, the interface element 931 may blink fast. When the source approaches the game character of the user slowly, the interface element 931 may blink slowly.

The game service providing server may determine a maximum value of distances between a center of the control interface and points included in the interface element based on the volume of the audio. For example, the game service providing server may adjust a distance between a highest point of the interface element 931 and the center point of the control interface to be proportional to the volume of the audio.

Figure 10A:
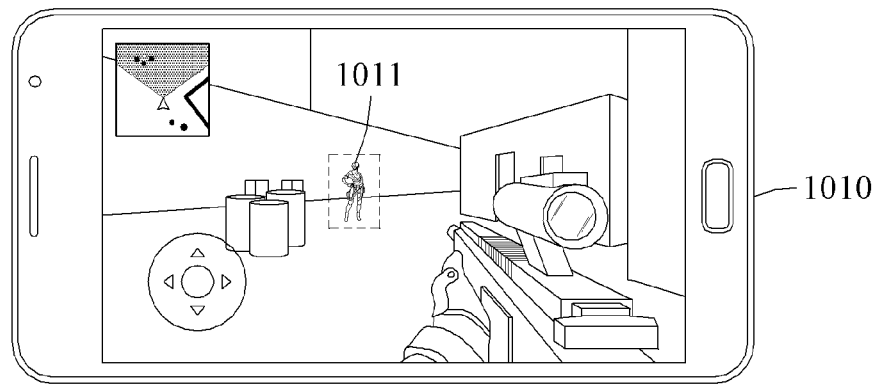
FIGS. 10A and 10B illustrate an example of visualizing an audio based on a partial region enlargement according to an example embodiment.
Figure 10B:
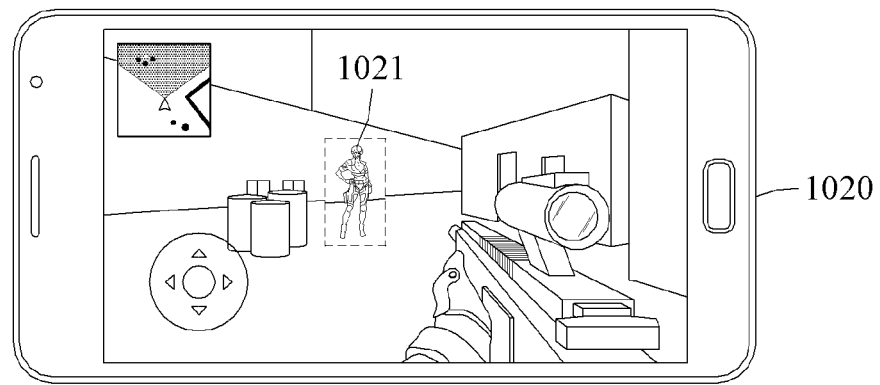

FIGS. 10A and 10B illustrate an example of visualizing an audio based on a partial region enlargement according to an example embodiment.

A game service providing server may obtain position data related to a position at which an audio is generated, determine a region on a game interface corresponding to the position data, and generate a game interface in which the audio generated in the vicinity is visualized by enlarging the determined region.

Referring to FIGS. 10A and 10B, when an audio is generated in a region 1011 corresponding to a game character on a front side of a screen displayed on a user terminal 1010, the game service providing server may provide a game interface in which a surrounding audio is visualized based on a region 1021 which is an enlargement of the region 1011, as shown in a user terminal 1020. In other words, when an object in the region 1011 generates an audio in a game, the object may be enlarged such that a user playing the game may visually recognize the audio. An enlargement ratio may vary depending on a volume of the audio. When the volume of the audio is high, the enlargement ratio may be relatively great. When the volume of the audio is low, the enlargement ratio of the object may be relatively small. When the object approaches a game character, the object may be repetitively enlarged and reduced. That is, when the object approaches the game character, the object may be enlarged, return to the original state, be enlarged again, and return to the original state again. When the object approaches the game character fast, the object may be repetitively enlarged and reduced at a high speed. When the object approaches the game character slowly, the object may be repetitively enlarged and reduced at a low speed.

Figure 11A:
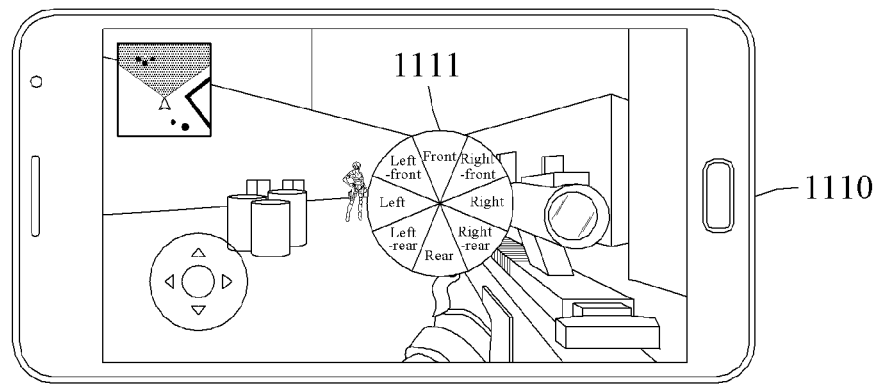
FIGS. 11A and 11B illustrate an example of a game interface in which a surrounding audio is visualized based on an interface element disposed on a gunpoint item according to an example embodiment.
Figure 11B:
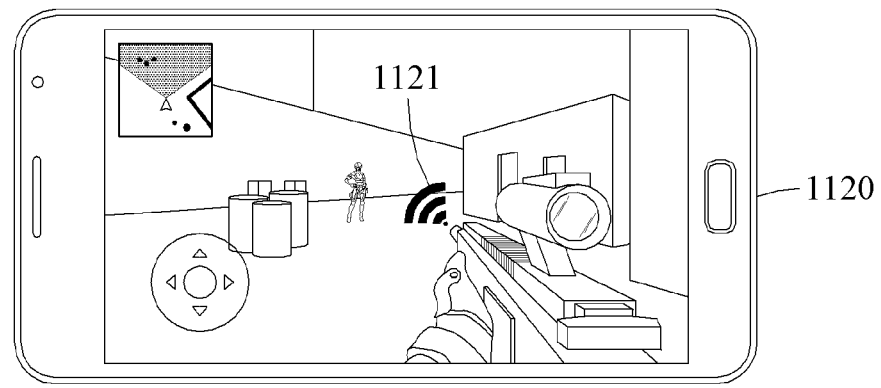

FIGS. 11A and 11B illustrate an example of a game interface in which a surrounding audio is visualized based on an interface element disposed on a gunpoint item according to an example embodiment.

As shown in a screen of a user terminal 1110, a game service providing server may predetermine directions corresponding to a plurality of regions included in a central region of a gunpoint. The directions corresponding to the plurality of regions may be determined based on fourth direction data determined based on a positional relationship between a center of the gunpoint and the respective regions.

The game service providing server may determine a region in which an interface element is to be disposed based on the fourth direction data of the regions and first direction data corresponding to a direction in which an audio is received. For example, a screen displayed on a user terminal 1120 illustrates a situation in which an interface element 1121 is disposed in a region corresponding to a direction in which an audio is received, based on the audio generated on a left-front side.

When a volume of the audio increases, a size of the interface element 1121 may increase. When the volume of the audio decreases, the size of the interface element 1121 may decrease. When the audio is generated by a game character of the same team, the interface element 1121 may be in blue. When the audio is generated by a game character of an opposing team, the interface element 1121 may be in red.

When a source generating the audio on the left-front side approaches a game character of a user, the interface element 1121 may blink. The source may be a game character of an opposing time or a game character of the same team. When the source approaches the game character of the user fast, the interface element 1121 may blink fast. When the source approaches the game character of the user slowly, the interface element 1121 may blink slowly.

Figure 12:
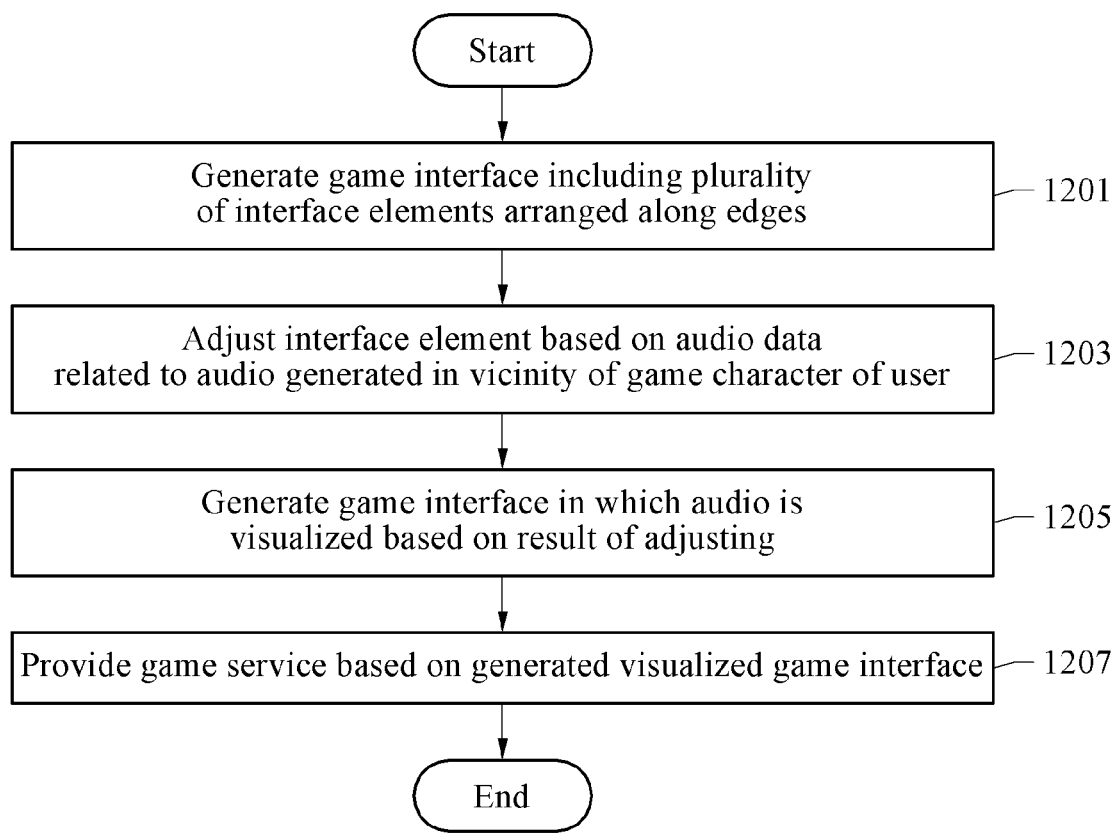
FIG. 12 is a flowchart illustrating a game service providing method according to an example embodiment.

FIG. 12 is a flowchart illustrating a game service providing method according to an example embodiment.

Referring to FIG. 12, in operation 1201, a game service providing server may generate a game interface including a plurality of interface elements disposed along edges.

In operation 1203, the game service providing server may adjust an interface element based on audio data related to an audio generated in the vicinity of a game character of a user.

The game service providing server may obtain first direction data related to a direction in which the audio is received based on the audio data, and obtain second direction data related to the plurality of interface elements based on a positional relationship between the interface elements and a central region of the game interface. The game service providing server may determine at least one interface element corresponding to the direction in which the audio is received based on the first direction data and the second direction data, and adjust a size of the at least one interface element.

The game service providing server may determine a size adjustment ratio of the at least one interface element based on a volume of the audio determined based on the audio data.

The game service providing server may determine a type of the interface element based on a type of the audio, and determine a color of the interface element based on the type of the audio.

When the audio corresponds to an audio generated intermittently, the game service providing server may control the interface element to blink based on a generation interval of the audio.

In operation 1205, the game service providing server may generate a game interface in which the audio is visualized based on a result of the adjusting.

In operation 1207, the game service providing server may provide a game service based on the visualized game interface.

Figure 13:
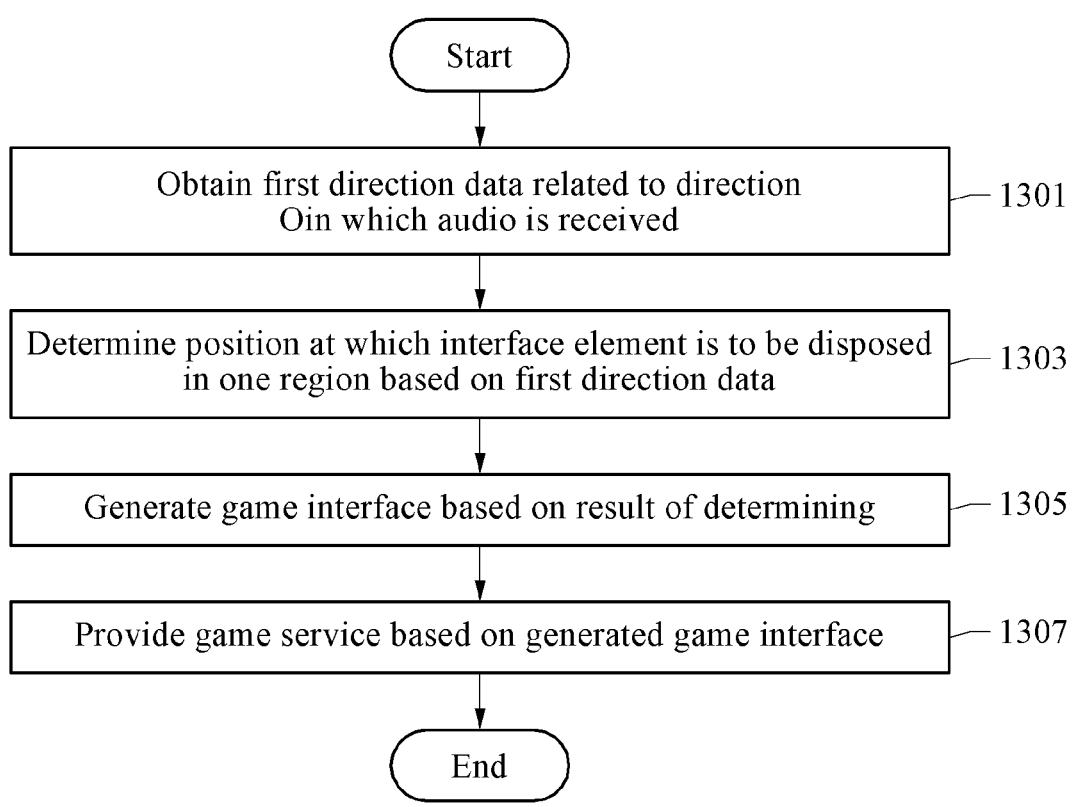
FIG. 13 is a flowchart illustrating a method of providing a game service through a game interface in which an interface element corresponding to an audio generated in the vicinity of a game character of a user is disposed in one region according to an example embodiment.

FIG. 13 is a flowchart illustrating a method of providing a game service through a game interface in which an interface element corresponding to an audio generated in the vicinity of a game character of a user is disposed in one region according to an example embodiment.

Referring to FIG. 13, in operation 1301, a game service providing server may obtain first direction data related to a direction in which an audio is received.

In operation 1303, the game service providing server may determine a position in which an interface element is to be determined in one region based on the first direction data.

The one region may include a mini map configured to provide position data of a game character, and the game service providing server may determine a region in the mini map in which the interface element is to be disposed based on the position data of the game character provided through the mini map and position data of a source generating the audio. Further, the game service providing server may determine the region in the mini map in which the interface element is to be disposed based on the first direction data and direction data predetermined with respect to respective regions included in the mini map.

The one region may include a region adjacent to a control interface configured to control a movement of the game character. The game service providing server may obtain third direction data related to a plurality of regions included in the adjacent region, the third direction data determined based on a positional relationship between the plurality of regions and a center of the control interface. The game service providing server may determine one region in which the interface element is to be disposed among the plurality of regions based on the first direction data and the third direction data.

In operation 1305, the game service providing server may generate a game interface based on the determined position.

In operation 1307, the game service providing server may provide a game service based on the generated game interface.

Figure 14:
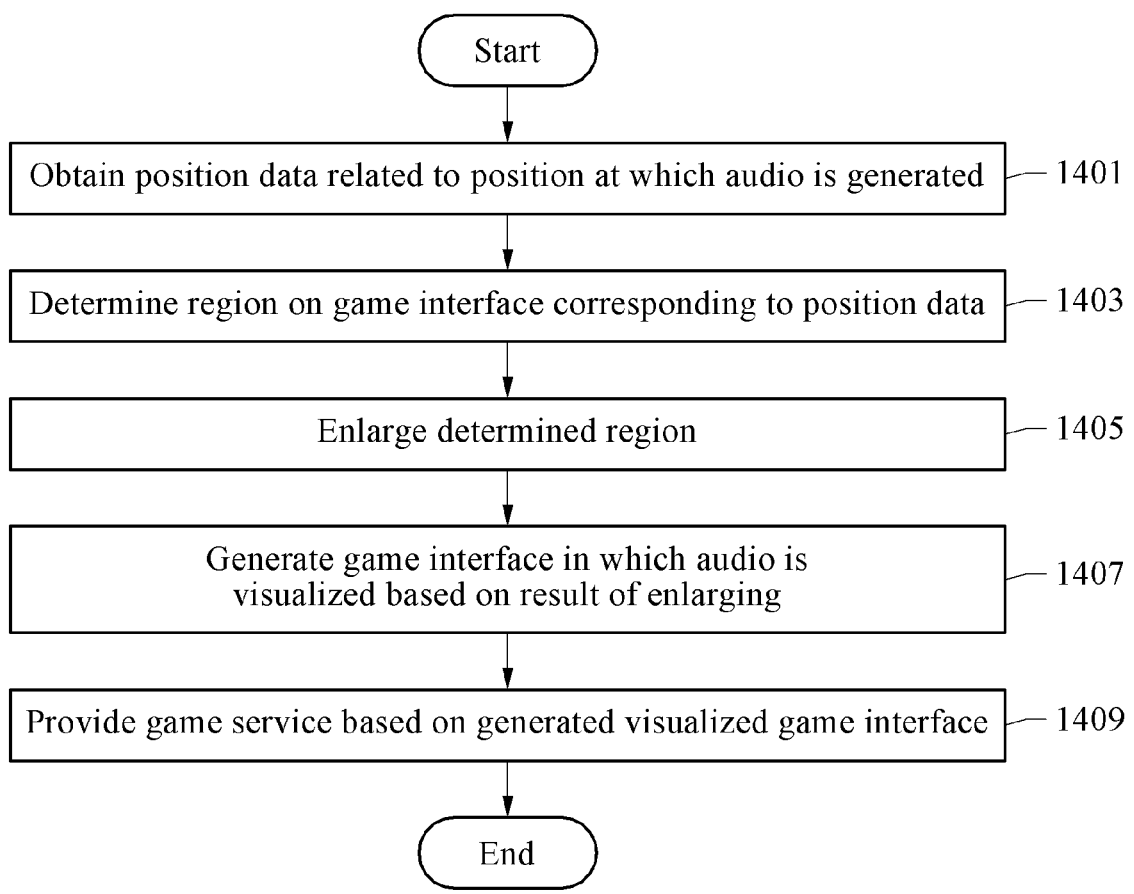
FIG. 14 is a flowchart illustrating a game service providing method according to an example embodiment.

FIG. 14 is a flowchart illustrating a game service providing method according to an example embodiment.

Referring to FIG. 14, in operation 1401, a game service operating server may obtain position data related to a portion at which an audio is generated.

In operation 1403, the game service operating server may determine a region on a game interface corresponding to the position data. For example, the game service operating server may determine a region in the game interface including a source generating the audio, and enlarge the determined region.

In operation 1405, the game service operating server may enlarge a region corresponding to the position data. In operation 1407, the game service operating server may generate a game interface in which the surrounding audio is visualized based on a result of the enlarging.

The game service operating server may determine an enlargement ratio of the determined region based on a volume of the audio, and enlarge the region based on the determined enlargement ratio. For example, the enlargement ratio may be set to increase as the volume of the audio increases.

When the audio is generated intermittently, the game service operating server may determine an interval of enlarging and reducing the determined region based on an interval of the audio, repeat enlarging and reducing the determined region based on the determined interval, and generate a game interface in which the surrounding audio is visualized based on the repeating.

In operation 1409, the game service operating server may provide a game service based on the generated visualized game interface.

Figure 15:
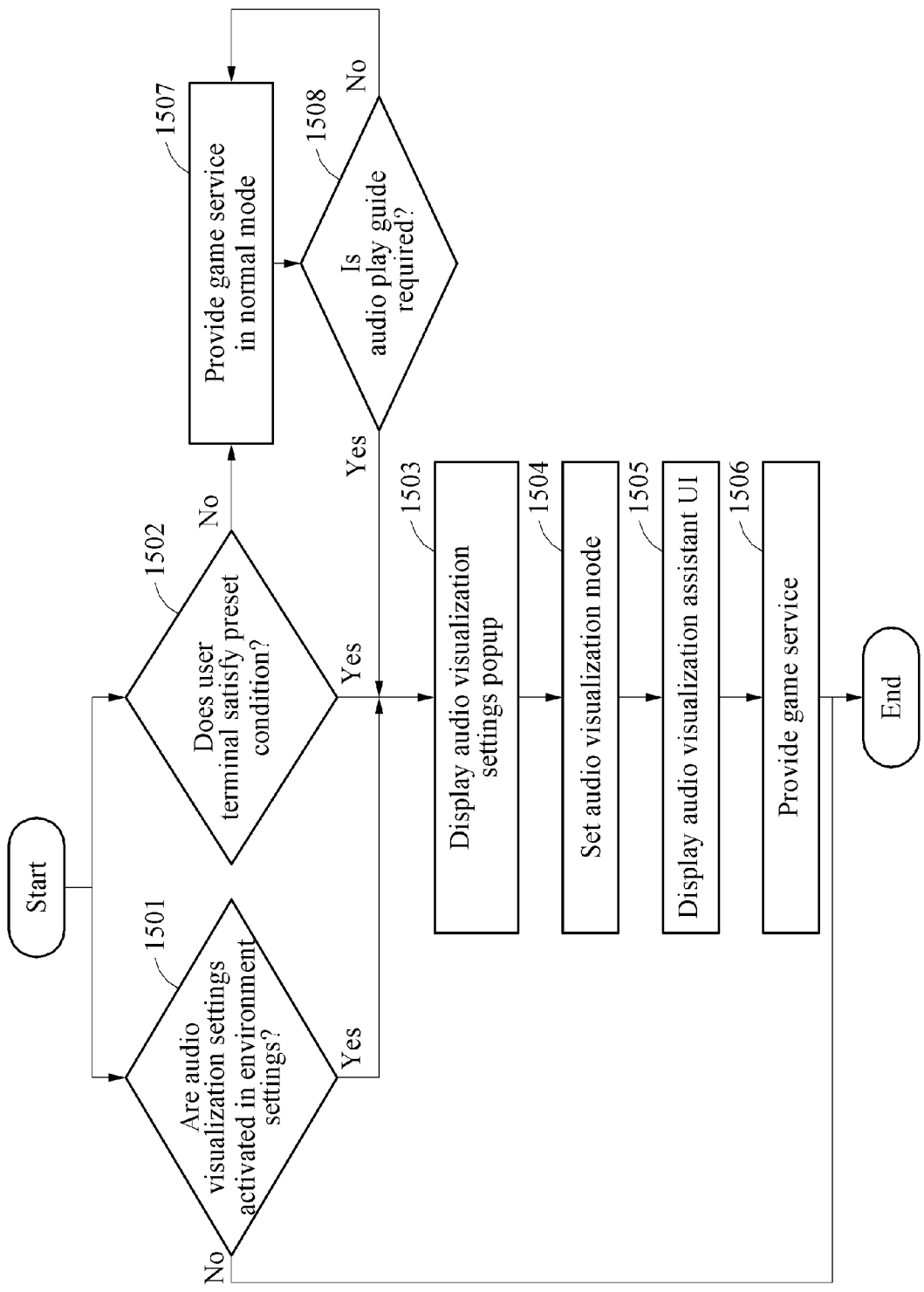
FIG. 15 is a flowchart illustrating an example of implementing a game service providing method according to an example embodiment.

FIG. 15 is a flowchart illustrating an example of implementing a game service providing method according to an example embodiment.

Referring to FIG. 15, in operation 1501, a game service providing server may verify whether audio visualization settings are activated in environment settings. When the audio visualization settings are activated, the game service providing server may display an audio visualization settings popup on a user terminal, in operation 1503. When the user terminal satisfies a preset condition in operation 1502, the game service providing server may display the audio visualization settings popup on the user terminal, in operation 1503. For example, the preset condition may be that an embedded microphone measured value should be above a predetermined level, a volume of the user terminal should be 0, the user terminal should be in a silent mode, or the user terminal should be in an audio accessibility mode provided for the hearing-impaired.

In operation 1504, the game service providing server may set an audio visualization mode. In operation 1505, the game service providing server may display an audio visualization assistant UI. In operation 1506, the game service providing server may provide a game service.

When the preset condition is not satisfied in operation 1502, the game service providing server may provide the game service in a normal mode in which an audio is provided, in operation 1507. In response to a determination of operation 1508 that an audio play guide is required, the game service providing server may display the audio visualization settings popup, in operation 1503.

The example embodiments described above may be applicable to various games such as shooters and massive multiplayer online role playing games (MMORPG).

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A game service providing server, comprising,
a processor configured to generate a game interface in which an audio generated in the vicinity of a game character of a user is visualized through an interface element, and provide a game service based on the generated game interface,
wherein the processor is configured to:
generate the game interface including a plurality of interface elements arranged in preset regions,
adjust at least one of the interface elements based on audio data related to the audio, wherein when the audio corresponds to an audio generated intermittently, the processor is configured to control the interface element to blink based on a generation interval of the audio,
generate the visualized game interface based on a result of the adjusting, and
electronically interface with a user terminal.

2. The game service providing server of claim 1, wherein the processor is configured to:
obtain first direction data related to a direction in which the audio is received based on the audio data related to the audio,
determine a position at which the interface element is to be disposed in one region based on the first direction data, wherein the one region includes a mini map configured to provide position data of the game character included in the game interface,
generate the game interface based on a result of the determining, and provide the game service based on the generated game interface.

3. The game service providing server of claim 1, wherein the processor is configured to:
obtain first direction data related to a direction in which the audio is received based on the audio data related to the audio,
determine a position at which the interface element is to be disposed in one region based on the first direction data, wherein the one region includes a region adjacent to a control interface configured to control a movement of the game character included in the game interface,
obtain third direction data related to a plurality of regions included in the adjacent region, the third direction data determined based on a positional relationship between the plurality of regions and a center of the control interface, and
determine one region in which the interface element is to be disposed among the plurality of regions based on the first direction data and the third direction data.

4. The game service providing server of claim 1, wherein the processor is configured to:
obtain first direction data related to a direction in which the audio is received based on the audio data,
obtain second direction data related to the plurality of interface elements based on a positional relationship between the interface elements and a central region of the game interface,
determine at least one interface element corresponding to the direction in which the audio is received based on the first direction data and the second direction data, and
adjust a size of the at least one interface element.

5. The game service providing server of claim 4, wherein the processor is configured to determine a size adjustment ratio of the at least one interface element based on a volume of the audio determined based on the audio data.

6. The game service providing server of claim 1, wherein the processor is configured to adjust at least one of a type, a size, transparency, and a color of the interface element based on a volume of the audio.

7. The game service providing server of claim 1, wherein the processor is configured to:
display an interface element corresponding to a type of the audio in the direction in which the audio is received, and determine a blinking rate of the displayed interface element based on a speed at which a game character generating the audio approaches the game character of the user.

8. A game service providing server, comprising:
a processor configured to generate a game interface in which an audio generated in the vicinity of a game character of a user is visualized, and provide a game service based on the generated game interface,
wherein the processor is configured to:
obtain position data related to a position at which the audio is generated based on audio data related to the audio,
determine a region on the game interface corresponding to the position data,
enlarge or reduce the determined region, wherein the determined region to be enlarged and reduced repetitively based on a generation interval of the audio when the audio is generated intermittently,
generate the visualized game interface based on a result of the enlarging or reducing, and
control the game service based on the generated visualized game interface.

9. The game service providing server of claim 8, wherein the processor is configured to determine an enlargement ratio of the determined region based on a volume of the audio.

10. A game service providing method, comprising:
determining a preset condition of a user terminal is satisfied;
generating a game interface including a plurality of interface elements;
adjusting an interface element based on audio data related to an audio generated in the vicinity of a game character of a user;
generating the game interface in which the audio is visualized based on a result of the adjusting;
providing a game service based on the visualized game interface to a user terminal; and
displaying an interface element corresponding to a type of the audio in a direction in which the audio is received,
wherein the adjusting comprises determining a blinking rate of the displayed interface element based on a speed at which a game character generating the audio approaches the game character of the user.

11. The game service providing method of claim 10, wherein the adjusting comprises:
obtaining first direction data related to a direction in which the audio is received based on the audio data; and
determining a position at which the interface element is to be disposed in one region based on the first direction data, wherein the one region includes a mini map configured to provide position data of the game character and the determining comprises determining a region on the mini map in which the interface element is to be disposed based on position data of the game character provided through the mini map and position data of a source providing the audio.

12. The game service providing method of claim 10, wherein the adjusting comprises:
obtaining first direction data related to a direction in which the audio is received based on the audio data;
obtaining second direction data related to the plurality of interface elements based on a positional relationship between the interface elements and a central region of the game interface;
determining at least one interface element corresponding to the direction in which the audio is received based on the first direction data and the second direction data; and
adjusting a size of the at least one interface element.

13. The game service providing method of claim 10, wherein the adjusting comprises adjusting at least one of a type, a size, transparency, and a color of the interface element based on a volume of the audio.

14. The game service providing method of claim 10, wherein the adjusting comprises adjusting the interface element based on a relationship between an entity generating the audio and the game character.

15. The game service providing server of claim 1, wherein the processor is configured to:
obtain first direction data related to a direction in which the audio is received based on the audio data related to the audio,
determine a position at which the interface element is to be disposed in one region based on the first direction data, wherein the one region includes a central region of a gunpoint included in the game interface, obtain fourth direction data related to a plurality of regions included in the central region, the fourth direction data determined based on a positional relationship between a center of the gunpoint and the respective regions, and determine one region in which the interface element is to be disposed among the plurality of regions based on the first direction data and the fourth direction data.

16. The game service providing server of claim 1, wherein the processor is configured to determine if the user terminal satisfies a preset condition.

17. The game service providing server of claim 16, wherein the preset condition is at least one of,
the user terminal comprises a volume setting and the volume setting is above zero,
the user terminal set to a silent mode,
the user terminal is set to an audio accessibility mode, and
the user terminal comprises an embedded microphone and a volume measured by the embedded microphone is above a predetermined value.

18. The game service providing method of claim 10, wherein the adjusting comprises:
obtaining first direction data related to a direction in which the audio is received based on the audio data;

determining a position at which the interface element is to be disposed in one region based on the first direction data, wherein the one region includes a central region of a gunpoint included in the game interface, obtaining fourth direction data related to a plurality of regions included in the central region, the fourth direction data determined based on a positional relationship between a center of the gunpoint and the respective regions, and determining one region in which the interface element is to be disposed among the plurality of regions based on the first direction data and the fourth direction data.

19. The game service providing server of claim 10, wherein the preset condition is at least one of,
the user terminal comprises a volume setting and the volume setting is above zero,
the user terminal set to a silent mode,
the user terminal is set to an audio accessibility mode, and
the user terminal comprises an embedded microphone and a volume measured by the embedded microphone is above a predetermined value.

* * * * *